United States Patent
Lucero et al.

Patent Number: 6,042,468
Date of Patent: Mar. 28, 2000

[54] CHICKEN BREAST DEBONING STABILIZATION DEVICE

[76] Inventors: Kevin Lucero, 5905 Waveland Dr., Las Vegas, Nev. 89130; Roger S. Rowe, 126 Cypress, Pine Knoll Shores, N.C. 28512

[21] Appl. No.: 09/136,281

[22] Filed: Aug. 20, 1998

[51] Int. Cl.[7] .................................................. A22C 21/00
[52] U.S. Cl. ........................... 452/165; 452/185; 452/196
[58] Field of Search ..................................... 452/165, 185, 452/194, 196, 160

[56] References Cited

U.S. PATENT DOCUMENTS

| | | |
|---|---|---|
| 3,122,780 | 3/1964 | Segur . |
| 4,037,294 | 7/1977 | Cowie et al. . |
| 4,385,419 | 5/1983 | Cantrell ................................... 452/165 |
| 4,557,017 | 12/1985 | Gasbarro . |
| 4,593,432 | 6/1986 | Hazenbrock . |
| 4,682,386 | 7/1987 | Hazenbrock et al. . |
| 4,704,769 | 11/1987 | Haneckak et al. . |
| 4,779,308 | 10/1988 | Van De Nieuwelaar et al. ..... 452/185 |
| 5,045,024 | 9/1991 | Diesing . |
| 5,098,337 | 3/1992 | Landt et al. . |
| 5,269,722 | 12/1993 | Diesing et al. . |
| 5,474,491 | 12/1995 | Koch . |
| 5,618,230 | 4/1997 | Bargele et al. . |
| 5,697,837 | 12/1997 | Verrijp et al. . |

*Primary Examiner*—Willis Little
*Attorney, Agent, or Firm*—Frank J. McGue

[57] ABSTRACT

A device is disclosed for stabilizing a poultry breast for deboning thereof. The device comprising a mandrel adapted to conform to the shape of the underside of a poultry breast. The device further comprises two prongs mounted on the mandrel which are adapted to engage a V joint between a severed wing bone and a breast bone of a poultry breast.

11 Claims, 1 Drawing Sheet

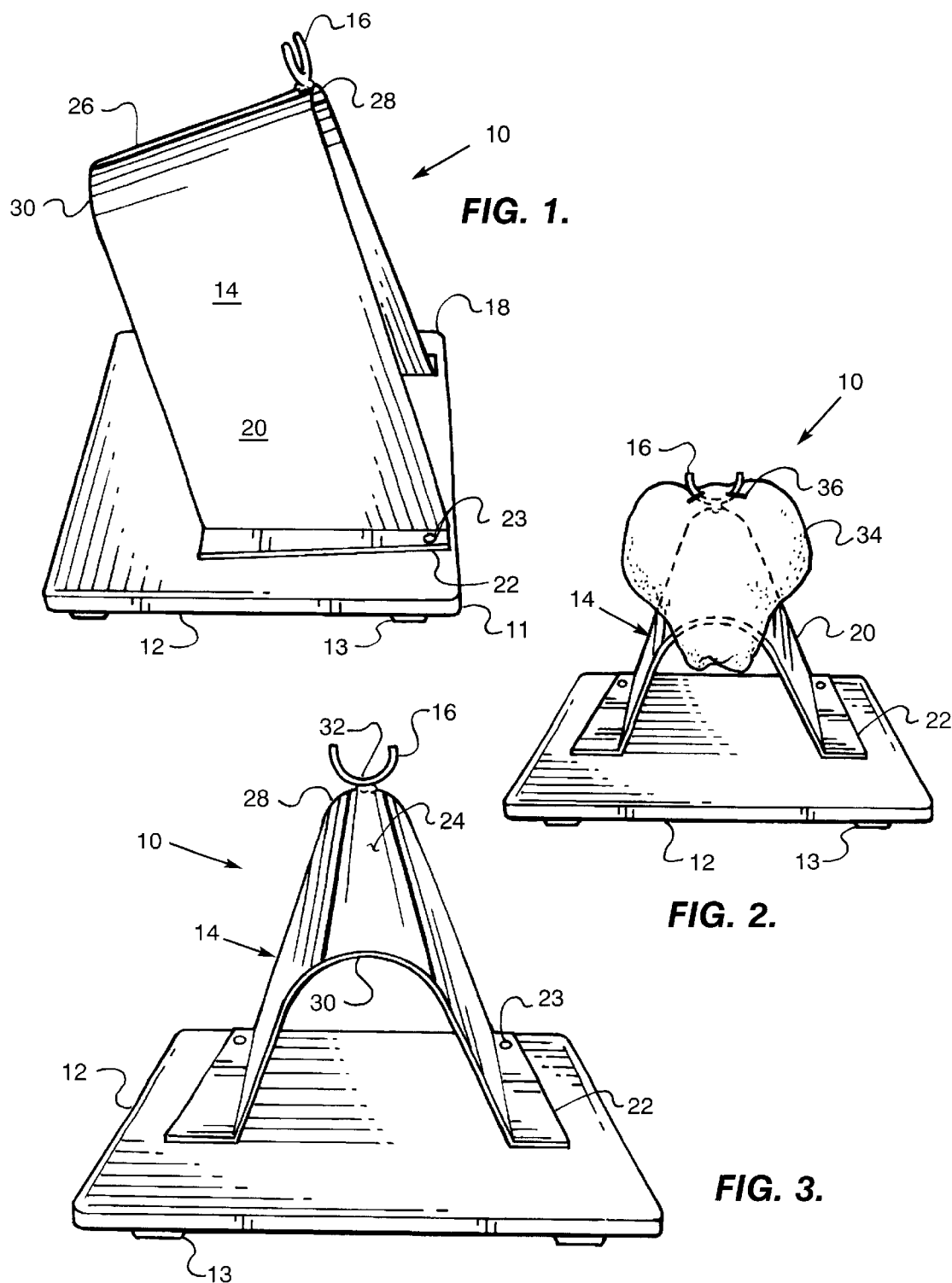

CHICKEN BREAST DEBONING STABILIZATION DEVICE

TECHNICAL FIELD

This invention relates to the deboning of meat, and, more particularly, the stabilization of a chicken breast to permit the manual deboning of meat therefrom.

BACKGROUND OF THE INVENTION

It has become apparent that one of the best sources of animal protein and fat for the diet is a deboned, skinless poultry breast, preferably, a chicken breast. The breast meat has the protein needed in a diet but minimizes the fat taken in as compared to other cuts such as from a leg or thigh. Deboned, skinless breast meat is now found in virtually every supermarket meat counter and restaurant menu. However, the extra labor needed to debone and skin the breast usually results in a steep premium price for that particular cut. In contrast, the complete breast is usually far less expensive than the deboned and skinless breasts. Thus, there is a need for a simple device which will allow an individual to simply, cheaply and safely, debone and skin a chicken breast in the food service industry, including restaurants and homes.

Various devices for deboning chicken breasts are known in the art. Obviously, one method is to simply use a knife and debone the chicken breast by hand. The use of the manual method is generally time consuming and provide less than satisfactory results. Also, the slippery nature of the meat due can often result in cuts to the hand. Thus, there is a need for stabilization of the breast for safety and for ease of use in the manual method.

U.S. Pat. No. 5,474,491 entitled "Mandrel Pin" which issued on Dec. 12, 1995 to Koch discloses a cone shaped mandrel on which an entire poultry carcass is placed. A retractable pin pierces the carcass to hold it on the mandrel.

U.S. Pat. No. 3,122,780 entitled "Poultry Meat Removal Method" which issued on Mar. 3, 1964 to Segur shows a saddle on which a poultry carcass is mounted. Segur uses a U-shaped element to anchor the carcass to prevent movement.

U.S. Pat. No. 4,682,386 entitled "Poultry Breast Filleting System" which issued on Jul. 28, 1987 to Hazenbrook et al. discloses a poultry carcass carrier or saddle having a pair of forwardly facing wing socket protrusions and an intermediate protrusion 34.

U.S. Pat. No. 4,557,017 entitled "Apparatus for Filleting Meat From Poultry Breast Sections" which issued on Dec. 10, 1985 to Gasbarro shows a mandrel with prongs which are disposed to receive a hole in the breast section which is located near the point where each wing has been removed.

None of the known prior art disclose the device set forth herein.

SUMMARY OF THE INVENTION

It is an object of this invention to provide a simple, easy to use device for deboning and skinning a chicken breast.

It is an object of this invention to provide an easy to clean device with no moving parts for deboning and skinning a chicken device.

It is still another object of this invention to stabilize a chicken breast at a safe and desirable working height and allow the breast to be deboned by hand.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a side perspective view of the present invention;

FIG. 2 is a front view of the present invention showing a chicken breast mounted thereon; and FIG. 3 is a front view of the present invention.

DESCRIPTION OF THE PREFERRED EMBODIMENT

Referring more particularly to the drawings by characters of reference, FIGS. 1–3 disclose a chicken breast deboning device 10 comprising a base 12 having feet 13, a mandrel 14 adapted to conform to the shape of the underside of a chicken breast mounted atop base 12 and two prongs 16 mounted atop mandrel 14.

In the presently preferred embodiment, base 12 is a rectangular or square FDA approved polyethylene cutting board having rounded edges 18. Four feet 13 are positioned at each corner thereof and are, preferably, non-skid buttons or bumpers. In one embodiment, base 12 is 12" (30.5 cm) wide by 18" (46 cm) long and either ½" (1.3 cm) or ¾" thick. Those skilled in the art will recognize that these dimensions and the material used are for purposes of illustration only. Many other dimensions and materials would be suitable for use. In addition, base 12 is an optional, though preferred, element of device 10.

Mandrel 14 preferably includes two opposing wide legs 20 with base portions 22 which are mounted to base 12 via screws and clamping knobs 23. In embodiments of device 10 without base 12, base portions 22 would support device 10 for storage but not for actual operation. In the presently preferred embodiment, legs 20 extend upwardly and inwardly towards one another making a 70° angle with base 12. The upper portions 24 of each leg are, preferably, integrally joined to an upper surface 26. Upper surface 26 forms an inverted U-shaped cross section with the two opposing legs 20. However, upper surface 26 also slopes downwardly from a rear end 28 to a front end 30.

Prongs 16 extend upwardly from rear end 28. In the presently preferred embodiment, prongs 16 are the legs of a u-bolt 32 which is mounted in an inverted fashion at rear end 28 of upper surface 26. In this embodiment, u-bolt 32 is a ¼ inch (0.6 cm) bolt providing a 1¾ inch (4.5 cm) separation between prongs 16. Those skilled in the art will recognize that the use of u-bolt 32 is a matter of design choice and that many other means of providing prongs 16 are possible.

Mandrel 14 is preferably 9¼" (23.5 cm) high at front end 30 and 12¼" (31 cm) high at rear end 28 thus upper surface 26 forms a 70° angle with the vertical from front to back. Front end 30 and rear end 28 are, preferably, 7" (18 cm) apart. Mandrel 14 has, in the presently preferred embodiment, a total width of 7" (18 cm).

In one embodiment, mandrel 14 is formed from 16 gauge food service grade stainless steel which is rolled in the middle to give it the desired shape. Each end of the mandrel 14 is bent at an angle to form base portions 22 which are 2¼" (5.7 cm) wide at front end 30 and 1" (2.5 cm) wide at rear end 28.

Those skilled in the art will recognize that the above materials, dimensions and slopes are for purposes of illustration with the exception of the separation between prongs 16 (2–3 inches, or 5–7.5 cm) and the general conical shape of upper surface 16. The two parameters are determined by the size and shape of a normal chicken breast. Those skilled in the art will recognize that the use of the present device for other types of poultry, for example, turkey or cornish game hen breasts, may require differing prong 16 separation or size of upper surface 16.

As best seen in FIG. 2, a whole chicken breast 34 is attached to device 10 by inserting prongs 16 through the underside of chicken breast 34, where upper severed wing bone and breast bone join to make an upside down V-shape. Breast 34 then conforms to and is stabilized by upper surface 26. Two incisions 36 are made to top right and top left breast lobes. The breast meat, rib meat and tenderloins are peeled by starting at incisions 36 and then running the fingers on the underside of the breast meat along the keel and rib bones toward the front end 30. The removal of the skin is optional.

Although only certain embodiments have been illustrated and described, it will be apparent to those skilled in the art that various changes and modifications may be made therein without departing from the spirit of the invention or from the scope of the appended claims.

What is claimed is:

1. A device for stabilizing a poultry breast for deboning thereof, the device comprising a mandrel, the mandrel having two opposing legs, the two opposing legs being integrally joined by an upper surface, the upper surface being adapted to conform to the shape of the underside of a poultry breast, the upper surface and the legs forming an inverted U-shape cross section, the upper surface sloping upward from a rear end to a front end thereof at an angle, and two prongs, each prong being adapted to engage a V shape joint between a severed wing bone and a breast bone in a poultry breast, the two prongs being mounted on and extending upwardly from the rear end of the mandrel.

2. The device of claim 1 further comprising a base, the mandrel being mounted to the base.

3. The device of claim 2 wherein a plurality of feet are mounted to the underside of the base.

4. The device of claim 3 wherein the base is rectangular in shape and includes four feet mounted to each corner of the base.

5. The device of claim 1 wherein the legs extend upwardly and inwardly towards one another, each leg forming a 70° angle with the horizontal.

6. The device of claim 1 wherein the upper surface forms about a 70° angle with the vertical from front to back, the upper surface further being about 7" long from the front end to the rear end.

7. The device of claim 1 wherein each leg includes a base portion for adapted to mount the device onto a surface.

8. The device of claim 1 wherein the prongs are the ends of a u-bolt mounted in an inverted manner on the mandrel.

9. The device of claim 1 wherein the prongs are separated by between 2–3 inches.

10. A device for stabilizing a chicken breast for deboning thereof, the device comprising:

a mandrel, the mandrel having two opposing legs, each leg including a base portion, the two opposing legs being integrally joined by an upper surface, the upper surface being adapted to conform to the shape of the underside of a chicken breast, the legs extending upwardly and inwardly at about a 70° angle with the horizontal, the upper surface and the legs forming an inverted U-shape cross section, the upper surface sloping upward from a rear end to a front end thereof at about a 70° angle, two prongs adapted to engage a V joint between a severed wing bone and a breast bone in a chicken breast, the two prongs being mounted at and extending upwardly from the rear end of the upper surface, the two prongs being separated by between 2 to 3 inches, a rectangular base, the base portions of the legs being mounted to the base, and four feet being mounted to each corner of the underside of the rectangular base.

11. The device of claim 10 wherein the prongs are the ends of a u-bolt mounted in an inverted manner on the rear end.

* * * * *